United States Patent
Beier et al.

(10) Patent No.: US 11,182,260 B1
(45) Date of Patent: Nov. 23, 2021

(54) AVOIDING RECOVERY LOG ARCHIVE ACCESS IN DATABASE ACCELERATOR ENVIRONMENTS

(71) Applicant: International Business Machines Corporation, Armonk, NY (US)

(72) Inventors: Felix Beier, Haigerloch (DE); Knut Stolze, Hummelshain (DE); Reinhold Geiselhart, Rottenburg-Ergenzingen (DE); Luis Eduardo Oliveira Lizardo, Boeblingen (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/189,328

(22) Filed: Mar. 2, 2021

(51) Int. Cl.
G06F 11/00 (2006.01)
G06F 11/14 (2006.01)
G06F 16/27 (2019.01)

(52) U.S. Cl.
CPC ...... G06F 11/1471 (2013.01); G06F 11/1451 (2013.01); G06F 16/275 (2019.01); *G06F 2201/80* (2013.01); *G06F 2201/82* (2013.01)

(58) Field of Classification Search
CPC .... G06F 16/27; G06F 16/275; G06F 11/1446; G06F 11/1451; G06F 11/1458; G06F 11/1469; G06F 11/1471; G06F 2201/80; G06F 2201/82
See application file for complete search history.

(56) References Cited

U.S. PATENT DOCUMENTS

| | | | |
|---|---|---|---|
| 6,029,178 A | 2/2000 | Martin | |
| 6,226,651 B1 | 5/2001 | Masuda | |
| (Continued) | | | |

FOREIGN PATENT DOCUMENTS

| | | |
|---|---|---|
| CN | 106294713 A | 1/2017 |
| CN | 110647579 A | 1/2020 |
| EP | 2562657 B1 | 2/2013 |

OTHER PUBLICATIONS

Lee et al., "Parallel replication across formats for scaling out mixed OLTP/OLAP workloads in main-memory databases", Apr. 16, 2018, Springer, The VLDB Journal (2018) 27, pp. 421-444 (Year: 2018).*

(Continued)

*Primary Examiner* — Michael Maskulinski
(74) *Attorney, Agent, or Firm* — David B. Woycechowsky (57) ABSTRACT

A method for maintaining linked databases including a source database and a target database, maintaining first metadata in a recovery log file of the source database, maintaining second metadata that identifies portions of data that are replicated from the source database to the target database as part of the selected partitions of the selected tables, receiving an indication that a crash of the source database has occurred, determining a first recovery metric value for recovering the source database's, determining a second recovery metric value for recovering the source database's data from the target database based on the second metadata, and determining whether to recover the source database's data from the recovery log file of the source database or from the target database based on a comparison of the determined first recovery metric value and the second recovery metric value.

18 Claims, 6 Drawing Sheets

(56) References Cited

U.S. PATENT DOCUMENTS

| | | | |
|---|---|---|---|
| 8,261,122 B1* | 9/2012 | Kappel | G06F 11/1402 |
| | | | 714/2 |
| 8,874,508 B1* | 10/2014 | Mittal | G06F 11/2048 |
| | | | 707/610 |
| 8,996,458 B2 | 3/2015 | Shang | |
| 9,141,670 B2 | 9/2015 | Branscome | |
| 9,442,995 B2 | 9/2016 | Pareek | |
| 9,659,077 B2 | 5/2017 | Chen | |
| 9,672,113 B1 | 6/2017 | Rodriques | |
| 10,275,507 B2 | 4/2019 | Hrle | |
| 10,339,013 B2 | 7/2019 | Chainani | |
| 10,540,346 B2 | 1/2020 | Martin | |
| 10,657,128 B2 | 5/2020 | Beier | |
| 10,698,883 B2 | 6/2020 | Beier | |
| 2005/0193024 A1 | 9/2005 | Beyer | |
| 2009/0319550 A1 | 12/2009 | Shau | |
| 2013/0085999 A1 | 4/2013 | Tung | |
| 2013/0159249 A1 | 6/2013 | Dewall | |
| 2014/0114924 A1 | 4/2014 | Abed | |
| 2014/0279930 A1 | 9/2014 | Gupta | |
| 2015/0205853 A1 | 7/2015 | Ngo | |
| 2015/0293820 A1 | 10/2015 | Doshi | |
| 2017/0177658 A1* | 6/2017 | Lee | G06F 11/1451 |
| 2017/0212902 A1* | 7/2017 | Graefe | G06F 11/1471 |
| 2018/0253483 A1 | 9/2018 | Lee | |
| 2020/0026714 A1 | 1/2020 | Brodt | |
| 2020/0034365 A1 | 1/2020 | Martin | |

OTHER PUBLICATIONS

List of IBM Patents or Patent Applications Treated as Related, Filed Mar. 2, 2021, 2 pages.

"A log merge method in active-active sites", An IP.com Prior Art Database Technical Disclosure, Authors et. al.: Disclosed Anonymously, IP.com No. IPCOM000254082D, IP.com Electronic Publication Date: May 31, 2018, 6 pages.

"ACID Properties of transactions", IBM, last updated Friday, Oct. 9, 2020, 1 page.

"Advanced Topics of Oracle Backup and Recovery", Chapter 15, downloaded from the internet on Oct. 9, 2020, 27 pages, <www.cs.kent.edu/~wfan/link/dbapre/dbatest/54915f.htm>.

"Data Recovery depending on the index segment", An IP.com Prior Art Database Technical Disclosure, Authors et. al.: Disclosed Anonymously, IP.com No. IPCOM000241553D, IP.com Electronic Publication Date: May 11, 2015, 4 pages.

"Dmrefresh—Refresh subscription," IBM, downloaded from the internet on Feb. 15, 2020, 3 pages, <https://www.ibm.com/support/knowledgecenteren/SSTRGZ_11.4.0/com.ibm.cdcdoc.mysql.doc/refs/dmrefresh.html>.

"Recovering Tables and Table Partitions", Oracle, Backup and Recovery User's Guide, downloaded from the internet on Oct. 9, 2020, 8 pages.

"Restore data using a recovery database", Microsoft Docs, Jul. 8, 2020, 4 pages, <https://docs.microsoft.com/en-us/exchange/high-availability/disaster-recovery/restore-data-using-recovery-dbs?view=exchserver-2019>.

"Restoring a source database", Progress Open Edge, downloaded from the internet on Oct. 9, 2020, 1 page, <https://documentation.progress.com/output/ua/OpenEdge_latest/index.html#page/ffr%2Frestoring-a-source-database.html.

Ballard et al., "Smarter Business Dynamic Information with IBM InfoSphere Data Replication CDC," IBM, Redbooks, Mar. 2012, 484 pages, <http://www.redbooks.ibm.com/redbooks/pdfs/sg247941.pdf>.

Becker et al., "IBM DB2 Analytics Accelerator High Availability and Disaster Recovery", IBM Redpaper, REDP-5104-00 was created or updated on May 8, 2014, 40 pages.

Leszczynski, Adam, "Oracle GoldenGate point in time source database recovery", Bersler, Jun. 12, 2018, 14 pages.

Mell et al., "The NIST Definition of Cloud Computing", Recommendations of the National Institute of Standards and Technology, NIST Special Publication 800-145, Sep. 2011, 7 pages.

Mohan et al., "ARIES: A Transaction Recovery Method Supporting Fine-Granularity Locking and Partial Rollbacks Using Write-Ahead Logging," ACM Transactions on Database Systems, vol. 17, No. 1, Mar. 1992, pp. 94-162.

Saleem, Muhammad Usman, "Cost Optimization for Data Placement Strategies in an Analytical Cloud Service," University of Stullgart, Master's Thesis, Oct. 17, 2016, 106 pages, <https://elib.uni-stuttgart.de/bitstream/11682/9824/1/main-report.pdf>.

Stolze et al., "Autonomous Data Ingestion Tuning in Data Warehouse Accelerators," Datenbanksysteme für Business, Technologie und Web (BTW 2017), 10 pages.

Stolze et al., "Extending Database Accelerators for Data Transformations and Predictive Analytics", Published in Proc. 19th International Conference on Extending Database Technology (EDBT), Mar. 15-18, 2016—Bordeaux, France: ISBN 978-3-89318-070-7, on OpenProceedings.org., 2 pages.

Stolze et al., "Partial Reload of Incrementally Updated Tables in Analytic Database Accelerators," Datenbanksysteme für Business, Technologie und Web (BTW 2019), Mar. 8, 2019, 11 pages, doi:10.18420/btw2019-27, <https://btw.informatik.uni-rostock.de/download/tagungsband/C7-2.pdf>.

* cited by examiner

AVOIDING RECOVERY LOG ARCHIVE ACCESS IN DATABASE ACCELERATOR ENVIRONMENTS

BACKGROUND

The invention relates generally to a recovery of a primary database, and more specifically, to a computer-implemented method for recovering source database data in a linked database system. The invention relates further to a linked database system for recovering source database data, and a computer program product.

Managing large amounts of data remains a continuous problem for enterprise IT (information technology) organizations. This is: (i) due to the ever-growing amount of data, and (ii) also due to the variety of the data. In addition to traditional structured data, also semi-structured and so-called unstructured data are stored in large amounts in enterprise IT systems. Furthermore, in addition to traditional transaction oriented databases, special database systems optimized for analytical processing have been introduced to satisfy the industry requirement for more and more data analytics. On the other hand, attempts have been made to do all analytical processing in a traditional transactional database. However, it turned out that the analytic processing has a too strong and unpredictable influence on the performance of online transaction processing.

As a consequence, clever combinations of transaction oriented database management systems with analytics optimized database management systems have been introduced. One example of such combined products is based on the IBM DB2 Analytics Accelerator (IDAA) architecture.

On one side, a full-blown row-based database management system (DBMS) may serve as an application endpoint for data manipulation language (DML) operations and query executions. Using heuristic decision criteria and rules, the query optimizer may transparently decide whether a query should be executed on the source DBMS—especially online transaction processing—or offloaded to a target DBMS—especially for online analytical processing.

The target DBMS may be a full-blown column-based database management system holding a shadow copy of a selected set of the source DBMS tables. Strategies for creating shadow copies of the target DBMS may comprise transferring data stored in one or more tables of the source DBMS to the target DBMS at a given point in time. However, data queried in the target DBMS might be out of date if the loading was performed some time ago and the corresponding source table has been modified in the meantime. Therefore, the contents of the tables are usually adapted incrementally as changes are recorded in the corresponding source database tables.

Strategies for creating shadow copies on the target database system may comprise of loading of the target database. At a given point in time, data contained in a table are transferred to the target database system. Queries might be outdated if the loading was conducted some time ago and the corresponding source table was changed in the meantime. Using replication techniques after an initial load, tables are incrementally updated to point recording changes on the corresponding source database tables.

It may also be understood that the source database system of the target database system has its specific suite spots in different workload characteristics, for example, OLTP (online transaction processing) versus OLAP (online analytical processing). Queries can be routed to the system matching its nature best. Applications do not require information on what system answered the query.

There are several disclosures related to a computer-implemented method for restoring and recovering source database data. Prior art describes a backup system comprising of a tape backup storage, storing a set of tape backup data, and the snapshot backup data storing a nearest snapshot. The set of tape backup data and the nearest snapshot enable recovery of backup data. Additionally, other prior also discloses a method to recover data from a backup. For that, the information segments in the index are used. The database would calculate the cost for the recovery to choose the minimum index set for the recovery. If the indexes are chosen to be used as candidate indexes, the system would read the index key to combine them together to get semi records. One might still miss some of the values and the records, but one could recover the most of the column as best.

However, none of the known solutions address the problem of a partially archived recovery log file which may render a recovery via the recovery log file comparably time-consuming. At least portions of the archived recovery log file would need to be reloaded from the archive.

Therefore, when a crash of the source database occurs, the recovery process needs to run for restoring the latest consistent database snapshot. The recovery process may load the source database from a persistent snapshot and incrementally apply changes from the local transaction log file to restore the latest committed database state. Typically, the state-of-the-art recovery processes are executed on the source database system, which stores the latest consistent database state before the crash with the help of transactional recovery log files. When the source database tables are updated frequently via database transactions, the log record volume grows significantly, and log records in the recovery log file may be moved to a large-volume log archive. If then log records need to be accessed from the log archive in the recovery case, this may cause significant performance penalties compared to access system log records that are stored in a lower layer of the memory hierarchy, such as local disks, flash memory or in-memory storage units.

Hence, there may be a need to overcome the negative effects involved in case of a database crash when portions of the recovery log file has been archived.

SUMMARY

According to one aspect of the present invention, a computer-implemented method for recovering source database data may be provided. The method may comprise maintaining linked databases comprising a source database and a related target database, wherein selected partitions of selected tables of the source database are synchronized with respective partitions of the selected tables in the target database. The method may also comprise maintaining first metadata in a recovery log file of the source database for tracking which log records for which data of the source database are archived when the log records are written to the recovery log file of the source database and, maintaining second metadata for data that are replicated from the source database to the target database as part of the selected partitions of the selected tables.

Upon a crash of the source database, the method may also comprise determining a first recovery metric value for recovering the source database's data by accessing the recovery log file of the source database based on the first metadata, determining a second recovery metric value for recovering the source database's data from the target database based on the second metadata, and determining whether to recover the source database's data from the recovery log file of the source database or from the target database based on a comparison of the determined first recovery metric value and the second recovery metric value.

According to another aspect of the present invention, a linked database system for recovering source database data may be provided. The linked database system for recovering source database data may comprise a processor and a memory, communicatively coupled to the processor. Thereby, the memory may store program code portions that, if executed, may enable the processor, to maintain linked databases comprising a source database and a related target database, wherein selected partitions of selected tables of the source database are synchronized with respective partitions of the selected tables in the target database.

The memory may also store program code portions that, if executed, may enable the processor to maintain first metadata in a recovery log file of the source database for tracking which log records for which data of the source database are archived when the log records are written to the recovery log file of the source database, and to maintain second metadata for data that are replicated from the source database to the target database as part of the selected partitions of the selected tables.

Additionally, the memory may store program code portions that, if executed, may—upon a crash of the source database—determine a first recovery metric value for recovering the source database's data by accessing the recovery log file of the source database based on the first metadata, to determine a second recovery metric value for recovering the source database's data from the target database based on the second metadata, and to determine whether to recover the source database's data from the recovery log file of the source database or from the target database based on a comparison of the determined first recovery metric value and the second recovery metric value.

The computer-implemented method for recovering source database data may offer multiple advantages, technical effects, contributions and/or improvements:

The problem of a partially archived recovery log file which may render a recovery via the recovery log file extremely time-consuming can be successfully addressed. The mechanism of synchronizing data from a source database to one or more target databases is—with some notable modifications—reversed. Thus, the data that may be available on a target database may not need to be recovered from the recovery log file and especially not from the archived portion of the recovery log file. This may help to overcome the typically slow read process from a large-volume, long-term archive storage. Instead, the comparably quick access to a target database record may be made.

This may also have the additional advantage that the target database may be read in large chunks so that the data may be bulk loaded into the table(s) of the recovering source database.

The remote recovery service may play an instrumental role to achieve this goal. Other involved components are the additional metadata—in particular the first and second metadata—which are also maintained. The same applies to determination units for the first and second recovery metric values.

In the following, additional embodiments of the inventive concept—applicable to the method as well as to the system—will be described.

According to an advantageous embodiment of the method, the first metadata may also comprise a recovery log file volume value and/or a volume value of archived log records. This information may be helpful in determining the recovery cost—that is, the second recovery metric value—or recovery effort when using the recovery log file as the sole source for the recovery process or the source database.

According to an advanced embodiment of the method, the target database may be a plurality of target databases. Different portions of the selected partitions of selected tables of the source database may be synchronized with respective different portions of the selected partitions of the selected tables with different target databases, and/or the second metadata may also comprise information denoting which portion of the selected tables of the source database is synchronized with which one of the plurality of target databases. It may be noted that one source database table may be replicated to one or more target databases. Other tables or partitions or portions thereof may only be synchronized with one of the target databases. This may depend on the required analysis data cubes for the multidimensional analysis for different user groups.

According to one permissive embodiment of the method, the determining the second recovery metric value may comprise determining a weighted sum of the second recovery metric values, wherein each one of the second recovery metric values corresponds to one of the plurality of target databases. Hence, the different target databases which may hold copies of portions of tables of the source database may be assigned to different weighing factors for determining the second recovery metric value.

According to a further enhanced embodiment of the method, the method can comprise a triggering of a remote recovery process—that is, a process to load data back from the target databases to the source data—which may comprise initiating parallel recovery streams from different ones of the plurality of target database. The parallel recovery streams may be associated with tables stored on target databases which have been determined to be instrumental in the recovery process of the source database.

According to an advantageous embodiment of the method, the determining of the second recovery metric value may comprise determining time values for: (i) identifying a selected portion of the source database's data in the target database, (ii) transforming the selected portion of the source database's data from a format used in the target database, and (iii) transmitting the transformed selected portion of the source database's data from the target database to the source database. This staged process may be useful to prepare the potentially column-based storage format of the target databases into a format easily integrateable into the source database for recovery purposes.

This may be especially helpful when the source database is optimized for transactions (OLTP) and wherein the source database may be a row-oriented relational database management system, and a target database may be optimized for analytical operations and/or wherein the target database may be a column-oriented database. In such scenarios, the target database may also often be an in-memory analytical database.

According to an interesting embodiment of the method, the metadata defining the selected table partitions may be part of the recovery log file. Hence, the recovery log file may represent the single source of truth for a recovery of the source database.

According to a preferred embodiment of the method, a read access directed to the source database may be redirected to at least one target database, during the recovery process. This may help to keep applications up and running and users may not even be aware of a problem in the database. However, this may only work if the data and the required tables are available in the target database.

According to a useful embodiment of the method, the first metadata may comprise a record sequence number of the most recent recovery record of a table—typically, for each table of the source database—in an online recovery log file storage, and/or the first metadata may comprise a record sequence number of the most recent recovery record of the table in an archive system archiving portions of the online recovery log file storage. Hence, the amount of online maintained records of the recovery log file may be determined in comparison to the amount of log files maintained in the archive portion of the recovery log file. This information may be used for a determination of the recovery metric values.

According to a further advantageous embodiment of the method, the target database may be an in-memory database. This may be best suited for a support of highly complex data cubes typically built for complex analysis operations and potentially extrapolations using the target database's data as prediction tool.

Furthermore, embodiments may take the form of a related computer program product, accessible from a computer-usable or computer-readable medium providing program code for use, by, or in connection, with a computer or any instruction execution system. For the purpose of this description, a computer-usable or computer-readable medium may be any apparatus that may contain means for storing, communicating, propagating or transporting the program for use, by, or in connection, with the instruction execution system, apparatus, or device.

According to an aspect of the present invention, there is a method, computer program product and/or system that performs the following operations (not necessarily in the following order): (i) maintaining linked databases including a source database and a target database, wherein selected partitions of selected tables as stored in the source database are synchronized with respective partitions of the selected tables in the target database; (ii) maintaining first metadata in a recovery log file of the source database that tracks which log records for which data of the source database are archived when the log records are written to the recovery log file of the source database; (iii) maintaining second metadata that identifies portions of data that are replicated from the source database to the target database as part of the selected partitions of the selected tables; (iv) receiving an indication that a crash of the source database has occurred; (v) responsive to the indication of the crash of the source database, determining a first recovery metric value for recovering the source database's data by accessing the recovery log file of the source database based on the first metadata; (vi) responsive to the indication of the crash of the source database, determining a second recovery metric value for recovering the source database's data from the target database based on the second metadata; and (vii) responsive to the indication of the crash of the source database, determining whether to recover the source database's data from the recovery log file of the source database or from the target database based on a comparison of the determined first recovery metric value and the second recovery metric value.

BRIEF DESCRIPTION OF THE SEVERAL VIEWS OF THE DRAWINGS

It should be noted that embodiments of the invention are described with reference to different subject-matters. In particular, some embodiments are described with reference to method type claims, whereas other embodiments are described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be disclosed within this document.

The aspects defined above, and further aspects of the present invention, are apparent from the examples of embodiments to be described hereinafter and are explained with reference to the examples of embodiments, but to which the invention is not limited.

Preferred embodiments of the invention will be described, by way of example only, and with reference to the following drawings.

DETAILED DESCRIPTION

In the context of this description, the following conventions, terms and/or expressions may be used:

The term 'linked databases' may denote at least two databases that are closely related to one another. In the context of this document linked databases may be denoted as those that may store, at least in part, identical data. On the other side, the primary database—that is, the source database may be optimized for other tasks than the secondary database, that is, the target database, in such a couple. It may also be noted that the plurality of target databases may be synchronized with parts of the source database.

The term 'source database'—or 'primary database'—may denote a database being optimized for, for example, fast transactions, that is, online transaction processing. However, databases optimized in such a way—that is, for fast read, write, update operations on the data—may be slow in performing complex queries involving a high number of tables or a large number of data, like in the case of online analytical processing. Additionally, the online analytical processing may slow down the online transaction processing. Therefore, highly optimized database management systems of the just mentioned types of databases may successfully work as a tandem.

The term 'target database'—or 'secondary database' or 'accelerator'—may denote the second database in such a tandem of databases being optimized for different tasks. In the context of the here described concept, the target database may be optimized for online analytical processing. It may store at least portions of the tables and portions of the data in the tables of the source database. The target database may optionally also be comprised of two portions: an in-memory portion for a fast execution of complex and multi-dimensional queries, and a persistent portion which may store the tables and data of the in-memory portion of the target database on the longer-term storage, for example, a hard disk or a flash memory. This way, the target database may be enabled to—in case of a crash of the target database—recover most of its content from the persistent storage. In some contexts, the target database may also be denoted as accelerator or accelerator database.

The term 'selected partitions of selected tables' may denote, at a minimum, at least a subset of the data of one database table may be selected. For different target databases, different subsets of the same table may be used. Alternatively, all data of a table may be synchronized with the target database as well as a plurality of database tables.

The term 'being synchronized' may denote that—in an ideal case—the content in the target database table may be identical with the content of the corresponding table and the source database. However, this may not always be possible because the entries that have just been committed to the source database have to be transformed, transmitted and have to update the target database. This may require some time in which new updates may already have happened in the source database. that is, the status of the target database may always be slightly behind the source database; however, despite this fact, the respective database tables or portions thereof shall be denoted as being synchronized.

The term 'crash recovery'—or shortly 'recovery'—may denote a process of reconstructing a state of a database before the crash has happened.

The term 'remote recovery process' may denote the activities occurring between the target database and the source database, wherein the target database may act as a data source for the recovery process of the source database.

The term 'recovery log file' may denote a sequential file protocolling operations being performed on a database, particularly, all those operations that modify the data, that is, insert, update and delete operations. The recovery log file may be designed to allow a complete reconstruction of the database. Therefore, also the table definitions of the database may be part of the recovery log file.

The term 'first metadata' may denote data about the recovery log file, in particular which recovery log records are still stored in the recovery log file which is quickly accessible because it is stored in-memory or persistently on a hard disk and which of the recovery log entries of the recovery log file may already be stored in an archived version in a long-term, large volume and comparably slow storage medium.

The term 'being archived' may denote the process of moving a data item from a comparably fast changing storage hierarchy layer, like a spinning disk, to a slower and typically cheaper storage medium, like a magnetic tape. This may happen for data that are not needed for immediate access. However, in case of a database crash they may be needed relatively quickly, but the physical parameters of the archive storage device do not allow a fast access.

The term 'second metadata' may denote information about which tables or parts thereof have been synchronized with the target database, or—in case of a plurality of target databases exist—in which of the target database the shadow copies may be available.

The term 'first recovery metric value' may denote a relative measure for how fast a recovery log record may be activated, that is, read, so that its content may be used in the source database recovery process. For a larger number of required recovery log file records, the first recovery metric value may vary significantly depending on its storage location, for example, online on a disk or offline on a tape.

The term 'second recovery metric value' may denote a relative measure for how fast a database record may be recovered from one of the potentially available target databases. In order to have comparable recovery metric values, one may determine a same number of records to be recovered either via the recovery log file or a bulk load from a target database.

In the following, a detailed description of the figures will be given. All instructions in the figures are schematic. Firstly, a block diagram of an embodiment of the inventive computer-implemented method for recovering source database data is given. Afterwards, further embodiments, as well as embodiments of the linked database system for recovering source database data, will be described.

Figure 1:
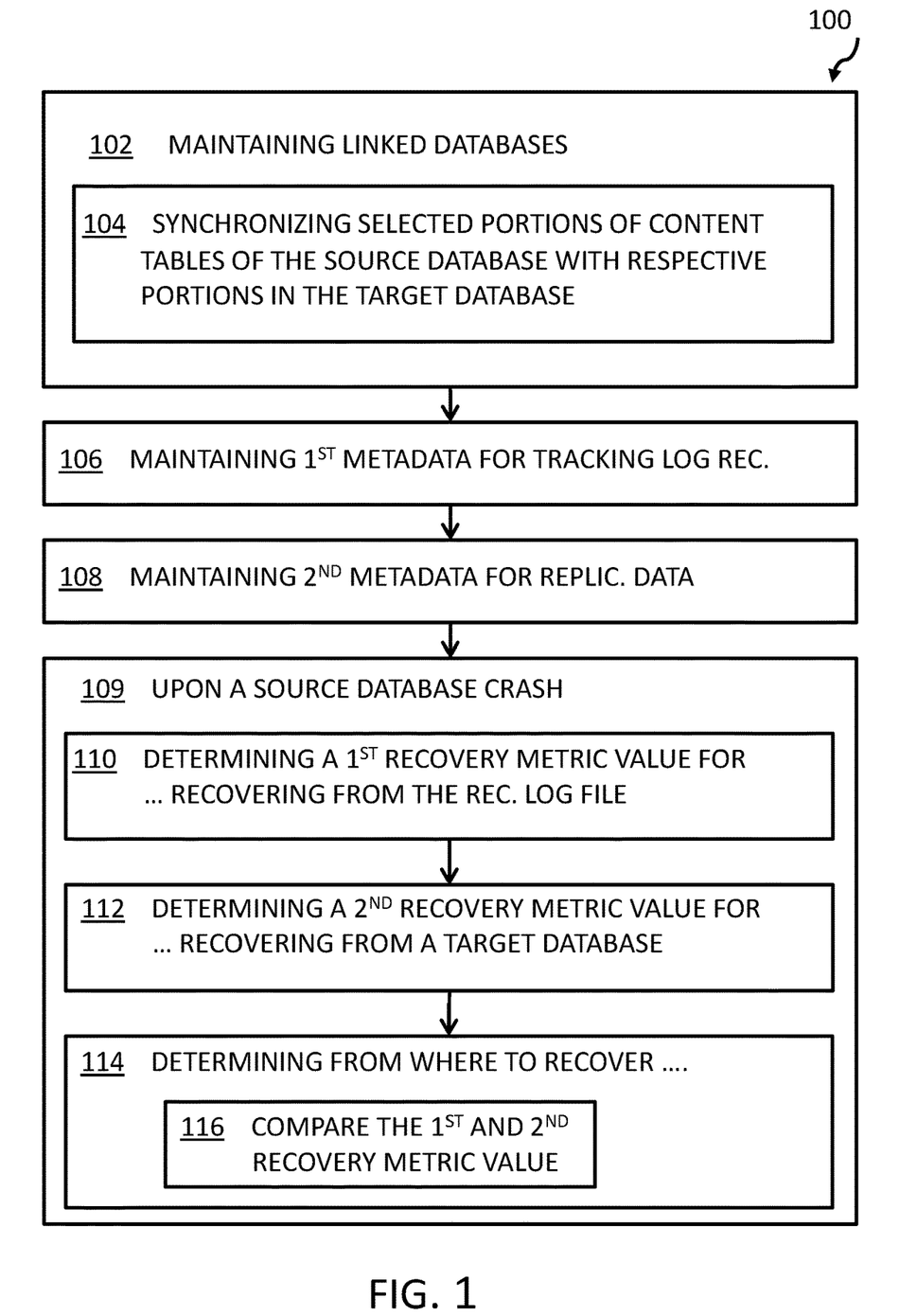
FIG. 1 shows a block diagram of an embodiment of the inventive computer-implemented method for recovering source database data.

FIG. 1 shows a block diagram of a preferred embodiment of the computer-implemented method 100 for recovering source database data. The method comprises maintaining, 102, linked databases comprising a source database and a related target database, wherein selected partitions of selected tables of the source database are synchronized, 104, with respective partitions of the selected tables in the target database.

The method 100 also comprises maintaining, 106, first metadata in a recovery log file of the source database for tracking which log records for which data of the source database are archived when the log records are written to the recovery log file of the source database, and maintaining, 108, second metadata for data that are replicated from the source database to the target database as part of the selected partitions of the selected tables.

Upon a crash or a partial crash, 109,—that is, only for a limited number of database tables—of the source database, the method 100 comprises determining, 110, a first recovery metric value for recovering the source database's data by accessing the recovery log file of the source database based on the first metadata, determining, 112, a second recovery metric value for recovering the source database's data from the target database based on the second metadata, and determining, 114, whether to recover the source database's data from the recovery log file of the source database or from the target database based on a comparison, 116, of the determined first recovery metric value and the second recovery metric value.

Figure 2:
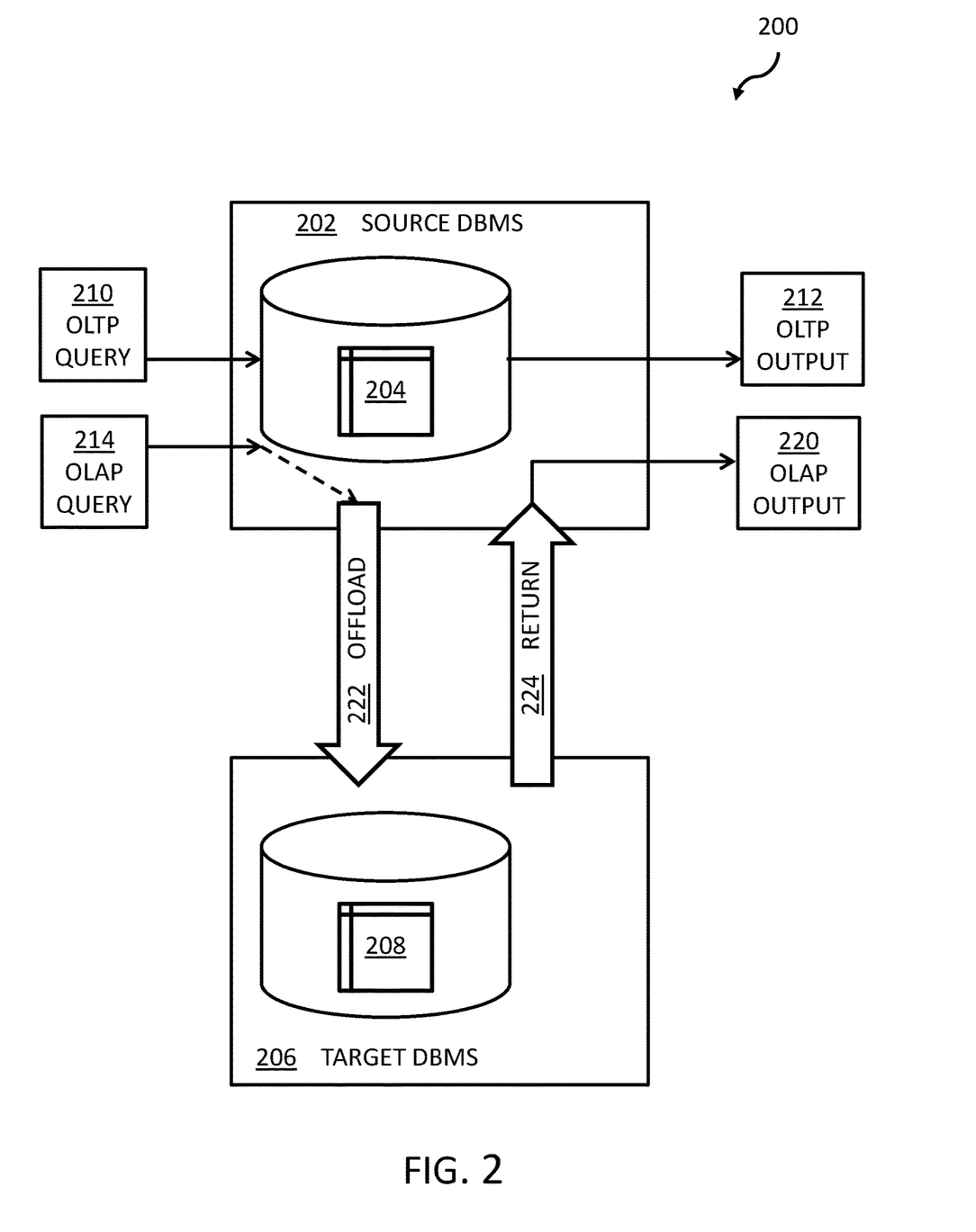
FIG. 2 shows a block diagram of an embodiment of linked databases.

FIG. 2 shows a block diagram of an embodiment 200 of linked databases. The primary or source database 202 receives OLTP queries 210 and OLAP queries 214. Those queries that are identified as OLAP queries 214 are transferred or offloaded, 222, to the secondary or target database 206. The source database 202 comprises a plurality of tables 204 and related stored data. The target database 206 also comprises tables which represent at least a subset of the database tables 204 of the source database 202 and at least a subset of the data in the database tables 208. The target database is also denoted as (database) accelerator.

After the OLAP operation has been performed by the target database 206, the data are returned, 224, and the OLAP output 220 is returned back to the requesting program or process. OLTP queries 210 are executed directly in the source database 202 and returned as OLTP output 212 to the requesting program or process. Hence, the OLTP or source database 202 may operate at its best performance because it is not slowed down by any resource intensive OLAP queries.

Because of a potentially different data organization in the target database 206—for example, column-oriented instead of row-oriented as in the source or OLTP database 202—the target database may return, 224, OLAP results much faster than the source database 202.

Figure 3:
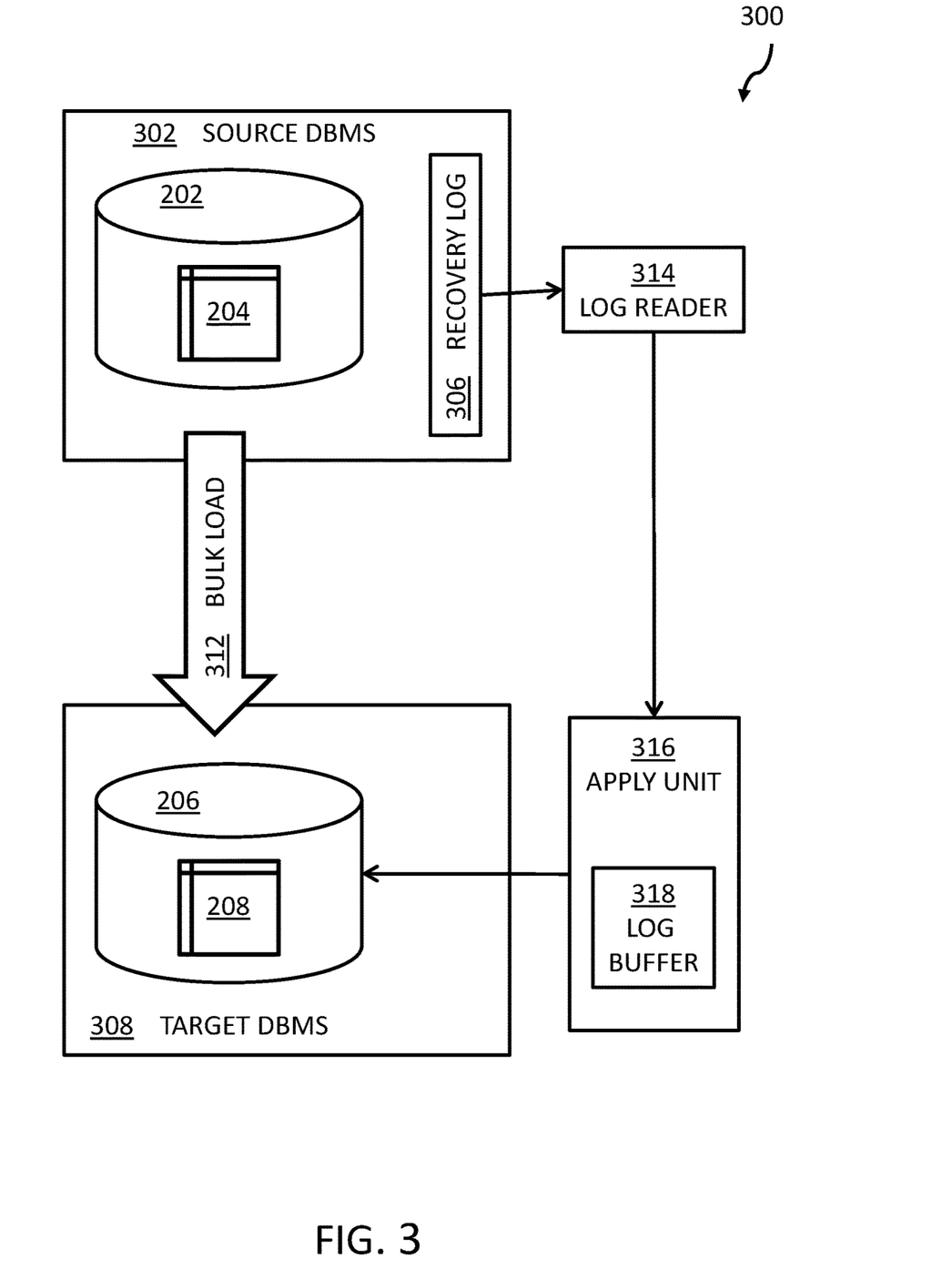
FIG. 3 shows a block diagram of an embodiment of how the target database can be synchronized with the source database.

FIG. 3 shows a block diagram of an embodiment 300 of how the target database can be synchronized with the source database. The source database management system 302 controls the operation of the source database 202 and its related tables 204 (compare FIG. 2). The same applies to the target database management system 308 for the target database 206 and the related tables 208.

The source database management system 302 also maintains the recovery log file 306 for the source database 202. A log reader or log file reader 314 reading the recovery log file 306 provides this data to the applying unit 316 which applies the changes (that is, insert, update, delete) performed to the source database also to the target database 206 for the selected tables and the selected set of data. The selected tables and the selected set of data may be a subset of those related tables and data in the source database 202, as defined beforehand. The applying unit 316 can optimize the application of the changes to the target database 206 depending on executed OLAP queries. For this, the log buffer 318 can be instrumental.

For an initialization of the target database 206, a bulk load operation 312 can be performed for performance reasons from the source database 202 to the target database 206.

It may be noted that this synchronization mechanism may represent one of many synchronization techniques. Also, other synchronization techniques from the source database to the target database may be applicable.

Figure 4:
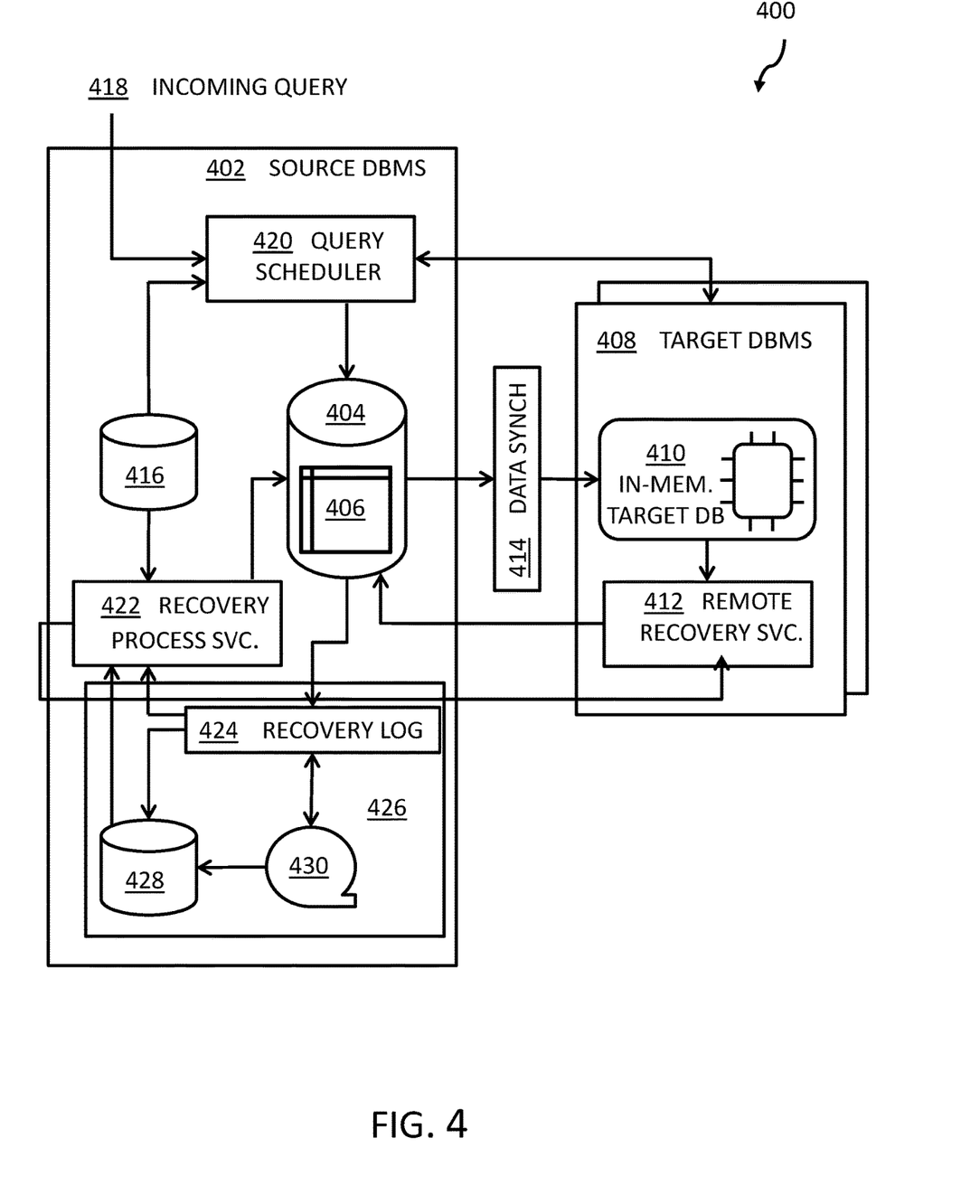
FIG. 4 shows a block diagram of an embodiment of the present invention in a more implementation-near form.

FIG. 4 shows a block diagram of an embodiment 400 of the present invention in a more implementation-near form. On the left side of FIG. 4 the source DBMS 402 is shown with the source database 404 comprising a plurality of database tables 406. On the other side, elements of the target DBMS 408 are shown, namely, the target database 410 (shown as an in-memory target database) and a remote recovery service 412.

In operation, IUD (insert, update, delete) operations in the source database 404 can be replicated or synchronized via a data synchronization service 414 to the target database 410. The source database metadata 416 comprises not only data about the organization of the source database 404 but also information about the portions of tables and data that have been synchronized to the target database 410.

An incoming query 418 is received at the query scheduler 420 and either directed to the source database 404—in particular, in case of an OLAP transaction—or to the target DBMS—in particular, in case of an OLAP query—to which the query is offloaded depending on its characteristic as an OLAP query. Furthermore, if the source database 404 has crashed (or only a part thereof), the query scheduler 420 can instead direct queries, which would be, under normal operational situations, served by the source database 404, to the target DBMS 408 for processing.

In case of a crash of the source database 404, there are different strategies to recover the source database 404. All of these operations can be controlled by the recovery process service or recovery processor 422. It can read the metadata 416 and discover which portions of the source database 404 have been synchronized with which target database 410—in case there are more target DBMSs 408. Data available in the target DBMS 408 can be loaded via the remote recovery service 412 back to the source database 404 and/or recovered from the recovery log file 424. Typically, one would use only those records in the recovery log file 424 which have a later timestamp than the last entry provided by the remote recovery service 412 from the target database 410.

The recovery log file 424 is shown as part of the transaction recovery log unit 426 which also comprises transaction log metadata 428 and a log archive 430. When the source database 404 tables are updated frequently by database transactions, the recovery log volume may grow significantly, and log records may be moved to the large-volume log archive 430. Now, when these records are needed by a source database 404 recovery process, it may take a long time to restore the required recovery log file entry from the slow, long-term, high-volume log archive 430.

The costly log archive access can be avoided when the source database 404 tables can be recovered from an attached database accelerator, that is, a target database 410. When log records are written to the transaction recovery log or recovery log file 424, additional metadata can also be maintained in the recovery log file 424 to track which log records have been archived already. Furthermore, statistics about the log data volume may also be written. This metadata can be used for the source database systems recovery process service 422 in order to determine system costs—in particular, in terms of required resources, for example, recovery metric values—for assessing the table's log entries when it needs to be restored. Additionally, the recovery process service 422 can read metadata for tables that are replicated to at least one attached target database 410. The second source of information may be used for determining the time to recover the respective table from the remote source, that is, one of the target databases 410. After determining both recovery metric values, the recovery process service 422 may decide which recovery strategy, local or remote recovery, will be faster and schedule recovery actions accordingly.

This may represent a solution for a significantly faster recovery process for the case that recovery log file 424 records are needed that have already been archived to the slow, large-volume, long-term archive 430.

Additional implementation details for transaction log metadata, the source database system recovery, the local recovery cost estimation, and the remote recovery cost estimation will be described in the following.

Transaction Log Metadata

When log records are written to the recovery log file for a specific table, the following may be recorded: the log sequence number of the most recent log record for this table, which is stored in the faster recovery log file storage. This may be a hard disk, a flash memory, or an in-memory storage.

When the recovery log records are archived in the recovery log file 424, the following is recorded: the log sequence number of the most recent log record of this table, which is stored in the slow archive 430.

Performance characteristics for accessing the different storage regions of the recovery log file entries can also be recorded, for example, access latency for receiving the first record with a specific log sequence number, bandwidth for reading a set of recovery log records, and so on. They can be statically configured, for example, derived from other parameters, or they may be dynamically derived, for example, by calibrating respective log access parameters.

Optionally, additional data statistics may be maintained similar to the statistics that may be used to estimate to-be-recover data volumes.

Source Database System Recovery

A list of tables that need to be recovered is determined and, with the help of metadata, the locations where they are stored are determined. While not all tables have been recovered, the following is executed in a loop process: (i) determine a next event/record to-be-recovered, for example, based on query scheduler information; and (ii) if the table is replicated to at least one target database 410, determine the respective recovery metric value for a local recovery strategy, estimate a recovery metric value for the remote recovery strategy, and recover the table with the recovery strategy having resource-wise minimal costs; else, recover the table locally using traditional recovery methods that parse the recovery log file 424; while parsing the recovery log file 424, entries for tables that are recovered from a remote source, that is, from a target database 410 are skipped.

Local Recovery Cost Determination

Firstly, the oldest log record sequence number that needs to be read for recovery is determined. Secondly, a log volume that needs to be assessed from each log storage region up to this oldest log record is determined; this is done either via metadata if statistics are directly maintained, or otherwise, log volumes are determined as a difference between the most recent log sequence number in a current and a next storage region in the underlying storage hierarchy.

Next, log access times for each log storage region that needs to be accessed is determined, for example, as: access latency for the first log record+transfer bandwidth*log-volume to read from this region. Furthermore, resource costs for incrementally restoring the database content via traditional log-based recovery strategies are determined. As return values, the resource costs (that is, those relating to recovery metric values) are returned.

Remote Recovery Cost Determination

Firstly, the total data volume of the to-be-recovered table is determined via target database metadata. Then, total resource costs (that is, corresponding to recovery metric values) for remote recovery streams are determined. This is done for the following: (i) for unloading the recovery data from the target database; (ii) for formatting the recovery data into a form art that can be bulk loaded by the source database; (iii) for transferring the formatted recovery data from the target database to the source database; and (iv) for bulk loading the recovery data into the source database. A return value of the just described routine is the total resource cost value, as described above.

Figure 5:
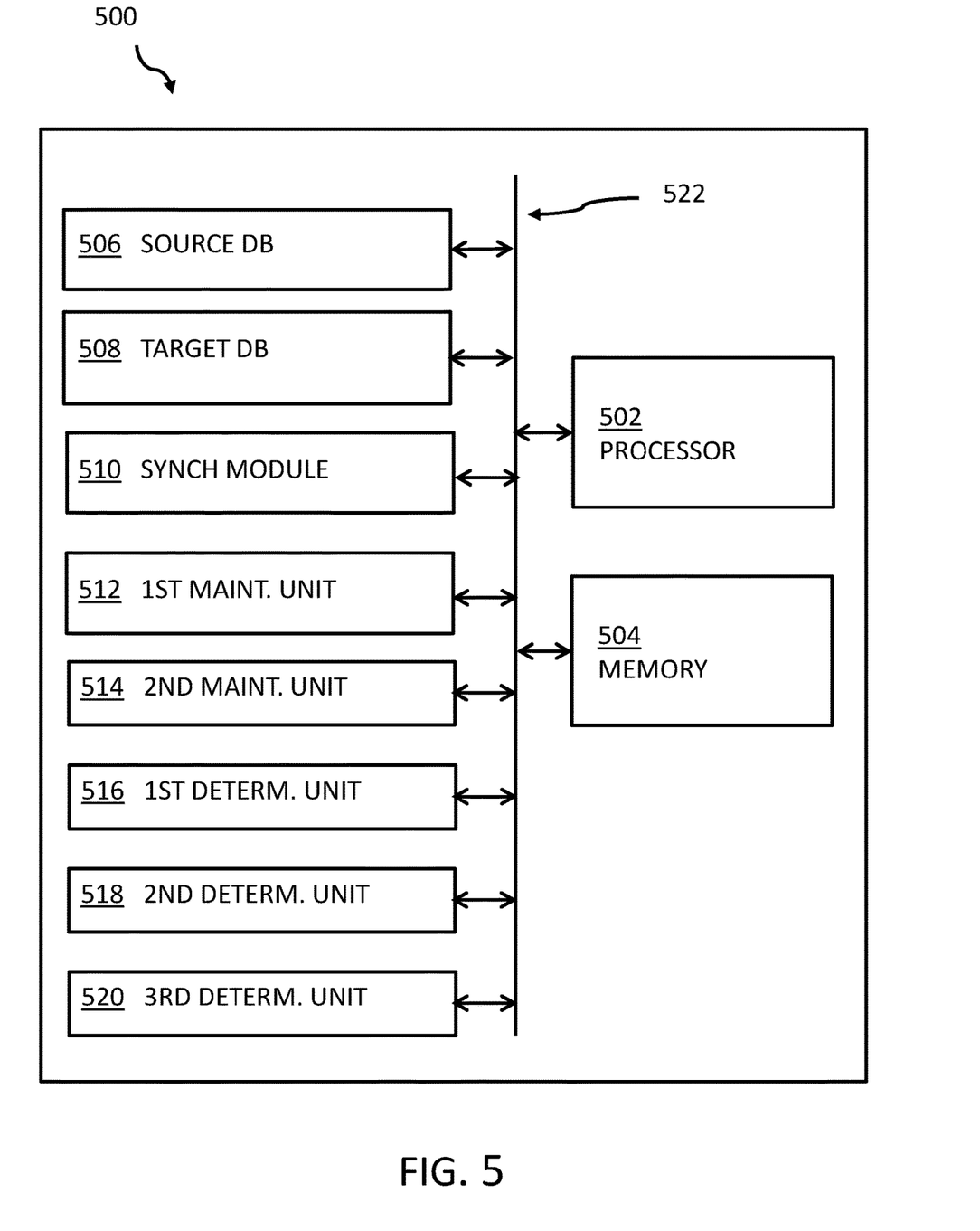
FIG. 5 shows a block diagram of the inventive linked database system for recovering source database data.

FIG. 5 shows a block diagram of the inventive linked database system 500 for recovering source database data. The linked database system comprises a processor 502 and a memory 504, communicatively coupled to the processor 502, wherein the memory 504 stores program code portions that, if executed, enable the processor, to maintain linked databases comprising a source database 506 and a related target database 508, wherein selected partitions of selected tables of the source database are synchronized—for example, by a synchronization module 510—with respective partitions of the selected tables in the target database.

The program code portions that, if executed, enable the processor 502 also to maintain—for example, by a first maintaining unit 512—first metadata in a recovery log file of the source database for tracking which log records for which data of the source database are archived when the log records are written to the recovery log file of the source database.

The program code portions that, if executed, enable the processor 502 also to maintain—for example, by a second maintaining unit 514—maintain second metadata for data that are replicated from the source database to the target database as part of the selected partitions of the selected tables.

The program code portions that, if executed, enable the processor 502 additionally—in particular in case of a crash of the source database—to determine—for example, by a first determination unit 516—a first recovery metric value for recovering the source database's data by accessing the recovery log file of the source database based on the first metadata, and to determine—for example, by a second determination unit 518—a second recovery metric value for recovering the source database's data from the target database based on the second metadata.

Last but not least, the program code portions that, if executed, enable the processor 502 also to determine—for example, by a third determination unit 520—whether to recover the source database's data from the recovery log file of the source database or from the target database based on a comparison of the determined first recovery metric value and the second recovery metric value. The recovery strategy with the lower recovery metric value may be chosen for a recovery of a certain table or the complete source database.

It may be noted that all functional units and modules of the linked database system 500 can be built in software, hardware or a combination thereof. Additionally, all functional units in modules of the linked database system 500 are communicatively and selectively coupled for data and/or a signal exchange. This applies in particular to the processor 502, memory 504, the source database or source database system 506, the target database or target database system 508, the synchronization module 510, the first maintaining unit 512, the second maintaining unit 514, the first determination unit 516, the second determination unit 518, and the third determination unit 520. The mentioned units and modules can be communicatively coupled in a 1:1 fashion or they can alternatively be linked to the linked database system internal bus system 522 for a multi-source/multi-target communication.

Figure 6:
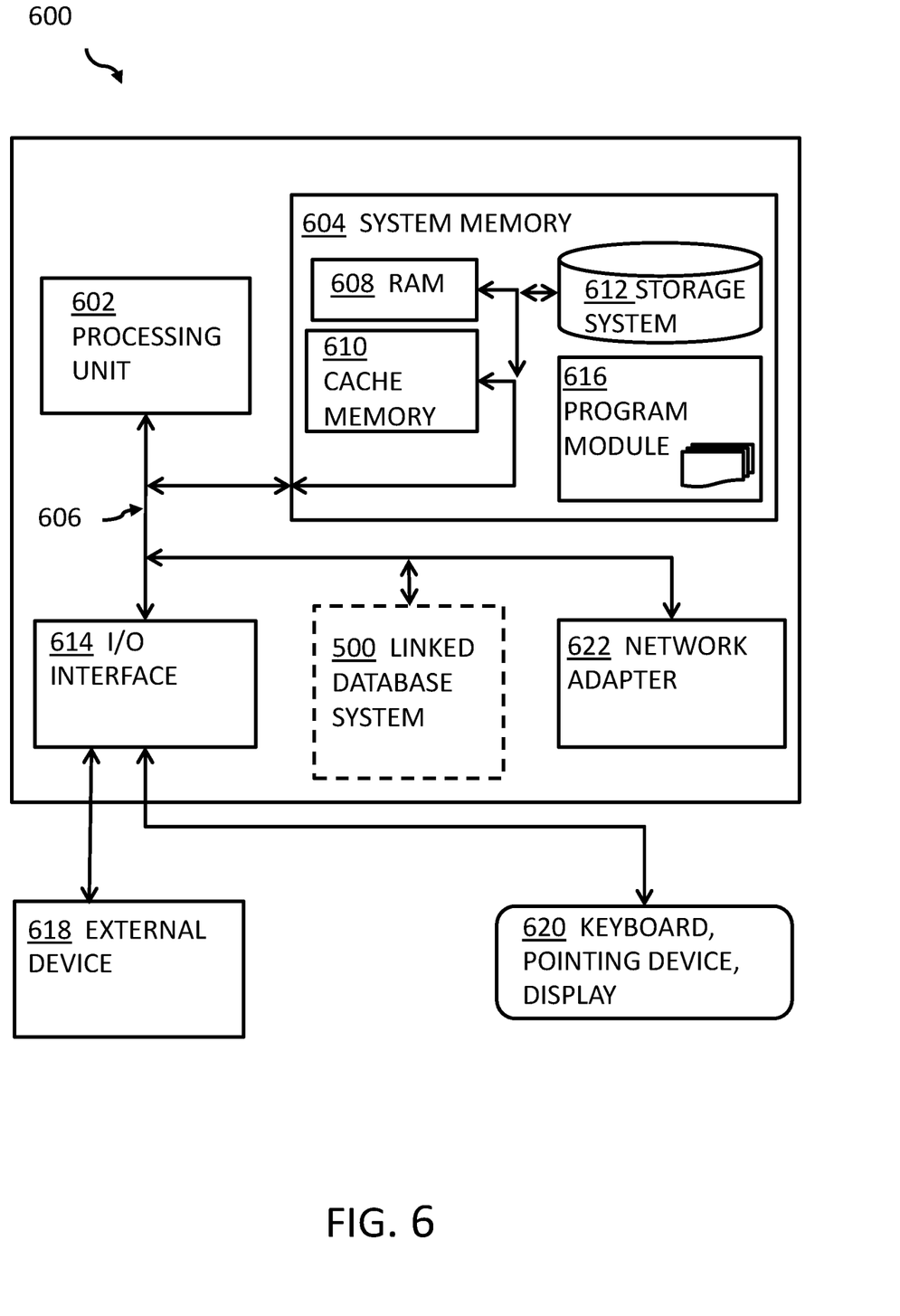
FIG. 6 shows an embodiment of a computing system comprising the linked database system according to FIG. 5.

Embodiments of the invention may be implemented together with virtually any type of computer, regardless of the platform being suitable for storing and/or executing program code. FIG. 6 shows, as an example, a computing system 600 suitable for executing program code related to the method.

The computing system 600 is only one example of a suitable computer system, and is not intended to suggest any limitation as to the scope of use or functionality of embodiments of the invention described herein, regardless, whether the computer system 600 is capable of being implemented and/or performing any of the functionality set forth hereinabove. In the computer system 600, there are components, which are operational with numerous other general purpose or special purpose computing system environments or configurations. Examples of well-known computing systems, environments, and/or configurations that may be suitable for use with computer system/server 600 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 600 may be described in the general context of computer system-executable instructions, such as program modules, being executed by a computer system 600. Generally, program modules may include routines, programs, objects, components, logic, data structures, and so on that perform particular tasks or implement particular abstract data types. Computer system/server 600 may be practiced in distributed cloud computing environments where tasks are performed by remote processing devices that are linked through a communications network. In a distributed cloud computing environment, program modules may be located in both, local and remote computer system storage media, including memory storage devices.

As shown in the figure, computer system/server 600 is shown in the form of a general-purpose computing device. The components of computer system/server 600 may include, but are not limited to, one or more processors or processing units 602, a system memory 604, and a bus 606 that couple various system components including system memory 604 to the processor 602. Bus 606 represents one or more of any of several types of bus structures, including a memory bus or memory controller, a peripheral bus, an accelerated graphics port, and a processor or local bus using any of a variety of bus architectures. By way of example, and not limiting, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 600 typically includes a variety of computer system readable media. Such media may be any available media that is accessible by computer system/server 600, and it includes both, volatile and non-volatile media, removable and non-removable media.

The system memory 604 may include computer system readable media in the form of volatile memory, such as random access memory (RAM) 608 and/or cache memory 610. Computer system/server 600 may further include other removable/non-removable, volatile/non-volatile computer system storage media. By way of example only, a storage system 612 may be provided for reading from and writing to a non-removable, non-volatile magnetic media (not shown and typically called a 'hard drive'). Although not shown, a magnetic disk drive for reading from and writing to a removable, non-volatile magnetic disk (for example, a 'floppy disk'), and an optical disk drive for reading from or writing to a removable, non-volatile optical disk such as a CD-ROM, DVD-ROM or other optical media may be provided. In such instances, each can be connected to bus 606 by one or more data media interfaces. As will be further depicted and described below, memory 604 may include at least one program product having a set (for example, at least one) of program modules that are configured to carry out the functions of embodiments of the invention.

The program/utility, having a set (at least one) of program modules 616, may be stored in memory 604 by way of example, and not limiting, as well as an operating system, one or more application programs, other program modules, and program data. Each of the operating systems, one or more application programs, other program modules, and program data or some combination thereof, may include an implementation of a networking environment. Program modules 616 generally carry out the functions and/or methodologies of embodiments of the invention, as described herein.

The computer system/server 600 may also communicate with one or more external devices 618 such as a keyboard, a pointing device, a display 620, etc.; one or more devices that enable a user to interact with computer system/server 600; and/or any devices (for example, network card, modem, etc.) that enable computer system/server 600 to communicate with one or more other computing devices. Such communication can occur via Input/Output (I/O) interfaces 614. Still yet, computer system/server 600 may communicate with one or more networks such as a local area network (LAN), a general wide area network (WAN), and/or a public network (for example, the Internet) via network adapter 622. As depicted, network adapter 622 may communicate with the other components of the computer system/server 600 via bus 606. It should be understood that, although not shown, other hardware and/or software components could be used in conjunction with computer system/server 600. Examples, include, but are not limited to: microcode, device drivers, redundant processing units, external disk drive arrays, RAID (redundant array of inexpensive disks) systems, tape drives, and data archival storage systems, etc.

Additionally, the linked database system 500 for recovering source database data may be attached to the bus system 606.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer readable storage medium (or media) having computer readable program instructions thereon for causing a processor to carry out aspects of the present invention.

The medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disk read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatuses, or another device to cause a series of operational steps to be performed on the computer, other programmable apparatus or other device to produce a computer implemented process, such that the instructions which execute on the computer, other programmable apparatuses, or another device implement the functions/acts specified in the flowchart and/or block diagram block or blocks.

The flowcharts and/or block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the invention. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skills in the art without departing from the scope and spirit of the invention. The embodiments are chosen and described in order to best explain the principles of the invention and the practical application, and to enable others of ordinary skills in the art to understand the invention for various embodiments with various modifications, as are suited to the particular use contemplated.

According to an aspect of the present invention, there is a method, computer program product and/or system for recovering source database data that performs the following operations (not necessarily in the following order): (i) maintaining linked databases comprising a source database and a related target database, wherein selected partitions of selected tables of the source database are synchronized with respective partitions of the selected tables in the target database,—maintaining first metadata in a recovery log file of the source database for tracking which log records for which data of the source database are archived when the log records are written to the recovery log file of the source database, (ii) maintaining second metadata for data that are replicated from the source database to the target database as part of the selected partitions of the selected tables, and (iii) upon a crash of the source database: (a) determining a first recovery metric value for recovering the source database's data by accessing the recovery log file of the source database based on the first metadata, (b) determining a second recovery metric value for recovering the source database's data from the target database based on the second metadata, and (c) determining whether to recover the source database's data from the recovery log file of the source database or from the target database based on a comparison of the determined first recovery metric value and the second recovery metric value.

In some embodiments, the first metadata also comprises a recovery log file volume value and/or a volume value of archived log records.

In some embodiments: (i) the target database is a plurality of target databases; (ii) different portions of the selected partitions of selected tables of the source database are synchronized with respective different portions of the selected partitions of the selected tables with different target databases; and (iii) the second metadata also comprise information denoting which portion of said selected tables is synchronized with which one of the plurality of target databases.

In some embodiments, the determining of the second recovery metric value comprises determining a weighted sum of the second recovery metric values, wherein each one of the second recovery metric values correspond to one of the plurality of target databases.

In some embodiments, the method further comprises triggering a remote recovery process which comprises initiating parallel recovery streams from different ones of the plurality of target databases.

In some embodiments, determining the second recovery metric value comprises determining time values for: (i) identifying a selected portion of the source database's data in the target database, (ii) transforming the selected portion of the source database's data from a format used in the target database, and (iii) transmitting the transformed selected portion of the source database's data from the target database to the source database.

In some embodiments, metadata defining the selected table partitions are part of the recovery log file.

In some embodiments, during the recovery process, read accesses directed to the source database are redirected to at least one target database.

In some embodiments: (i) the first metadata comprises a record sequence number of the most recent recovery record of a table in an online recovery log file storage, and (ii) the first metadata comprises a record sequence number of the most recent recovery record of the table in an archive system archiving portions of the online recovery log file storage.

In some embodiments, the target database is an in-memory database.

In some embodiments, the program code portions for the determination of the second recovery metric value enable the processor as well to determine a weighted sum of the second recovery metric values, wherein each of the second recovery metric values correspond to one of the plurality of target databases.

In some embodiments, the method comprises program code portions for triggering a remote recovery process that enable the processor also to trigger a remote recovery process which comprises initiating parallel recovery streams from different ones of the plurality of target databases.

In some embodiments, the program code portions for determining the second recovery metric enable the processor also to determine time values for: (i) identifying a selected portion of the source database's data in the target database, (ii) transforming the selected portion of the source database's data from a format used in the target database, and (iii) transmitting the transformed selected portion of the source database's data from the target database to the source database.

In some embodiments, the program code portions that enable the processor during the recovery process to redirect read accesses directed to the source database at least one target database.

What is claimed is:

1. A computer-implemented method (CIM) comprising:
   maintaining linked databases including a source database and a target database, wherein selected partitions of selected tables as stored in the source database are synchronized with respective partitions of the selected tables in the target database;
   maintaining first metadata in a recovery log file of the source database that tracks which log records for which data of the source database are archived when the log records are written to the recovery log file of the source database;
   maintaining second metadata that identifies portions of data that are replicated from the source database to the target database as part of the selected partitions of the selected tables;
   receiving an indication that a crash of the source database has occurred;
   responsive to the indication of the crash of the source database, determining a first recovery metric value for recovering the source database's data by accessing the recovery log file of the source database based on the first metadata;
   responsive to the indication of the crash of the source database, determining a second recovery metric value for recovering the source database's data from the target database based on the second metadata; and
   responsive to the indication of the crash of the source database, determining whether to recover the source database's data from the recovery log file of the source database or from the target database based on a comparison of the determined first recovery metric value and the second recovery metric value.

2. The CIM of claim 1 wherein the first metadata includes a recovery log file volume value and/or a volume value of archived log records.

3. The CIM of claim 1 wherein:
   different portions of the selected partitions of selected tables of the source database are synchronized with respective different portions of the selected partitions of the selected tables with different target databases; and
   the second metadata includes information denoting which portion of the selected tables is synchronized with which one of the plurality of target databases.

4. The CIM of claim 3 further comprising triggering a remote recovery process which comprises initiating parallel recovery streams from different ones of the plurality of target databases.

5. The CIM of claim 1 wherein the determination of the second recovery metric value includes: determining a weighted sum of the second recovery metric values, wherein each one of the second recovery metric values correspond to one of a plurality of target databases.

6. The CIM of claim 1 wherein the determination of the second recovery metric value includes:
- determining time values for identifying a selected portion of the source database's data in the target database;
- determining time values for transforming the selected portion of the source database's data from a format used in the target database; and
- determining time values for transmitting the transformed selected portion of the source database's data from the target database to the source database.

7. A computer program product (CPP) comprising:
- a set of storage device(s); and
- computer code stored collectively in the set of storage device(s), with the computer code including data and instructions to cause a processor(s) set to perform at least the following operations:
  - maintaining linked databases including a source database and a target database, wherein selected partitions of selected tables as stored in the source database are synchronized with respective partitions of the selected tables in the target database,
  - maintaining first metadata in a recovery log file of the source database that tracks which log records for which data of the source database are archived when the log records are written to the recovery log file of the source database,
  - maintaining second metadata that identifies portions of data that are replicated from the source database to the target database as part of the selected partitions of the selected tables,
  - receiving an indication that a crash of the source database has occurred,
  - responsive to the indication of the crash of the source database, determining a first recovery metric value for recovering the source database's data by accessing the recovery log file of the source database based on the first metadata,
  - responsive to the indication of the crash of the source database, determining a second recovery metric value for recovering the source database's data from the target database based on the second metadata, and
  - responsive to the indication of the crash of the source database, determining whether to recover the source database's data from the recovery log file of the source database or from the target database based on a comparison of the determined first recovery metric value and the second recovery metric value.

8. The CPP of claim 7 wherein the first metadata includes a recovery log file volume value and/or a volume value of archived log records.

9. The CPP of claim 7 wherein:
- different portions of the selected partitions of selected tables of the source database are synchronized with respective different portions of the selected partitions of the selected tables with different target databases; and
- the second metadata includes information denoting which portion of the selected tables is synchronized with which one of the plurality of target databases.

10. The CPP of claim 9 wherein the computer code further includes instructions for causing the processor(s) set to perform the following operation(s):
- triggering a remote recovery process which comprises initiating parallel recovery streams from different ones of the plurality of target databases.

11. The CPP of claim 7 wherein the determination of the second recovery metric value includes: determining a weighted sum of the second recovery metric values, wherein each one of the second recovery metric values correspond to one of a plurality of target databases.

12. The CPP of claim 7 wherein the determination of the second recovery metric value includes:
- determining time values for identifying a selected portion of the source database's data in the target database;
- determining time values for transforming the selected portion of the source database's data from a format used in the target database; and
- determining time values for transmitting the transformed selected portion of the source database's data from the target database to the source database.

13. A computer system (CS) comprising:
- a processor(s) set;
- a set of storage device(s); and
- computer code stored collectively in the set of storage device(s), with the computer code including data and instructions to cause the processor(s) set to perform at least the following operations:
  - maintaining linked databases including a source database and a target database, wherein selected partitions of selected tables as stored in the source database are synchronized with respective partitions of the selected tables in the target database,
  - maintaining first metadata in a recovery log file of the source database that tracks which log records for which data of the source database are archived when the log records are written to the recovery log file of the source database,
  - maintaining second metadata that identifies portions of data that are replicated from the source database to the target database as part of the selected partitions of the selected tables,
  - receiving an indication that a crash of the source database has occurred,
  - responsive to the indication of the crash of the source database, determining a first recovery metric value for recovering the source database's data by accessing the recovery log file of the source database based on the first metadata,
  - responsive to the indication of the crash of the source database, determining a second recovery metric value for recovering the source database's data from the target database based on the second metadata, and
  - responsive to the indication of the crash of the source database, determining whether to recover the source database's data from the recovery log file of the source database or from the target database based on a comparison of the determined first recovery metric value and the second recovery metric value.

14. The CS of claim 13 wherein the first metadata includes a recovery log file volume value and/or a volume value of archived log records.

15. The CS of claim 13 wherein:
- different portions of the selected partitions of selected tables of the source database are synchronized with respective different portions of the selected partitions of the selected tables with different target databases; and the second metadata includes information denoting which portion of the selected tables is synchronized with which one of the plurality of target databases.

16. The CS of claim 15 wherein the computer code further includes instructions for causing the processor(s) set to perform the following operation(s):

triggering a remote recovery process which comprises initiating parallel recovery streams from different ones of the plurality of target databases.

17. The CS of claim 13 wherein the determination of the second recovery metric value includes: determining a weighted sum of the second recovery metric values, wherein each one of the second recovery metric values correspond to one of a plurality of target databases.

18. The CS of claim 13 wherein the determination of the second recovery metric value includes:

determining time values for identifying a selected portion of the source database's data in the target database;

determining time values for transforming the selected portion of the source database's data from a format used in the target database; and determining time values for transmitting the transformed selected portion of the source database's data from the target database to the source database.

* * * * *